United States Patent [19]

Bittner et al.

[11] Patent Number: 5,075,098

[45] Date of Patent: * Dec. 24, 1991

[54] METHOD OF PREPARING NA$_2$S (II)

[75] Inventors: Friedrich Bittner, Bad Soden; Walter Hinrichs, Bruehl; Lutz Hippe, OberRamstadt; Ludwig Lange, Bruehl; Erich Splett, Huerth-Berrenrath, all of Fed. Rep. of Germany

[73] Assignee: Degussa Aktiengesellschaft, Frankfurt am Main, Fed. Rep. of Germany

[*] Notice: The portion of the term of this patent subsequent to Aug. 13, 2008 has been disclaimed.

[21] Appl. No.: 510,269

[22] Filed: Apr. 19, 1990

[30] Foreign Application Priority Data

Apr. 22, 1989 [DE] Fed. Rep. of Germany ....... 3913258

[51] Int. Cl.$^5$ .............................................. C01B 17/22
[52] U.S. Cl. ................................ 423/566.2; 423/562
[58] Field of Search ...................... 423/565, 566.2, 562

[56] References Cited

U.S. PATENT DOCUMENTS 4,640,832  2/1987  Bittner et al. ...................... 423/565

OTHER PUBLICATIONS

Handbook of Chemistry and Physics, 63rd ed., 1982-1983, Chemical Rubber Company Press—Boca Raton, Florida, p. B-151.

Primary Examiner—Gary P. Straub
Assistant Examiner—Timothy C. Vanoy
Attorney, Agent, or Firm—Beveridge, DeGrandi & Weilacher

[57] ABSTRACT

A method of preparing sodium monosulfide by means of reacting a sodium polysulfide with sodium under protective gas, the sodium polysulfide is placed in a first stage in a finely distributed, solid state in a receiver, preheated to temperatures of 100°–150° C., liquid sodium is gradually added in the required amount to the material in the receiver under intensive mixing, whereby the temperature of the reaction mixture is maintained at 120°–250° C. and in a second stage the formed initial product is allowed to continue to react, or postreact under continuation of the mixing at 250°–480° C., until a Na$_2$S content of at least 95% by weight has been attained.

4 Claims, No Drawings

METHOD OF PREPARING NA₂S (II)

INTRODUCTION AND BACKGROUND

The present invention relates to a method of preparing sodium monosulfide by means of reacting a sodium polysulfide with sodium under a protective gas.

Sodium monosulfide, $Na_2S$, is an important reagent for introducing sulfur into organic molecules. Several methods are known according to which this compound can be prepared. It can be obtained, for example, by means of reacting sodium salts with hydrogen sulfide in aqueous or alcoholic solutions or by means of the reduction of sodium sulfate and carbon or hydrogen. A problem with such known methods is the fact that products contaminated with reactants always accumulate which must be separated from the impurities by being dissolved in suitable solvents and by filtering.

Since the elements sodium and sulfur react extremely vigorously with one another (enthalpy of formation for $Na_2S: \Delta H_B = -389.1$ kJ/mole), a direct method of preparation from the elements which are commercially available in great purity could not feasibly be used for industrial purposes in the past.

Moisture-free $Na_2S$ in sufficiently pure form was only obtainable by means of a process involving dewatering the hydrate $Na_2S.9H_2O$ under an atmosphere of hydrogen. This hydrate had to be prepared by means of reacting sodium hydrogen sulfide with NaOH in a polar solvent (Kirk-Othmer, 3d edition (1982), vol. 18, pp. 793-847, especially pp. 803 and 809).

The prior art, namely, DE-PS 34 36 698 discloses a method of preparing sodium polysulfides from the elements sodium and sulfur in which the sodium and the sulfur under protective gas in a stoichiometric proportion corresponding to the desired polysulfide are charged alternately into a melt of a polysulfide placed in a reaction receiver means under vigorous agitation. The portions are measured in such a manner that during the charging of sodium the reaction mixture remains in the state of an agitatible suspension and during the charging of the sulfur the latter is allowed to react completely in each instance to form a polysulfide of a higher sulfur content.

German patent application P 38 31 737.0 describes a method of preparing low sodium polysulfides from higher sodium polysulfides and sodium in which the higher sodium polysulfide is placed in a reaction receiver vessel under a protective gas in molten form and the sodium is charged into the melt in a stoichiometric proportion corresponding to the desired polysulfide product. Vigorous agitation is used in the process. Amounts of reactants used are such that the reaction mixture remains in the state of an agitatible suspension. The agitation is continued until the formation of the product has been completed.

It would also be basically possible according to these two methods to recover sodium monosulfide by providing the required stoichiometric proportion for the combined together sulfur and the sodium. However, since the known methods require a melt as reaction medium which consists at least at the final stage of the reaction process of $Na_2S$ alone, an economically feasible reactor vessel material would hardly be available as a consequence of having to contain the very high melting point $Na_2S$ compound (1180°-1200° C.) and on account of the strong chemical aggressivity of the melt.

SUMMARY OF THE INVENTION

An object of the invention is to provide a method of preparation whereby a high-percentage sodium monosulfide can be economically prepared from a sodium polysulfide, especially one of the compounds $Na_2S_5$, $Na_2S_4$, $Na_2S_3$, $Na_2S_2$, without requiring a reaction medium in molten form present in the reaction system and using relatively low reaction temperatures.

In attaining the above and other objects, one feature of the invention resides in a method of preparing sodium monosulfide by means of reacting a sodium polysulfide with sodium under a protective gas in a plurality of stages. In a first stage, the sodium polysulfide in finely distributed, solid state is placed in a receiver preheated to temperatures of 100°-150° C. Liquid sulfur is then gradually added in the required amount to the sodium polysulfide material in the receiver vessel under intensive mixing, preferably under kneading and/or grinding. During this operation, the temperature of the reaction mixture is maintained at 120°-250°, preferably 140°-200° C. Thereafter in a second stage, the product formed in the initial or first stage, which is colored bluish-black, is allowed to continue to react or post-react, under continuation of the mixing at 250°-480°, preferably 350°-400° C., until a $Na_2S$ content of at least 95% by weight has been attained with light coloring.

Inert gas, preferably argon, is used as a protective gas.

The selection of the correct reactor material is also significant here. According to an advantageous embodiment of the invention, the reaction is carried out in a reactor vessel fabricated so that the parts which come in contact with the reaction mixture are formed of aluminum alloys, especially AlMg3 or AlMn or sintered alumina or SiC or of glassy carbon. Alternatively, the reactor vessel parts can be cladded, coated or jacketed with these materials to provide good protection against corrosion.

DETAILED DESCRIPTION OF THE INVENTION

A particularly important measure in the method of the invention resides in the use of mixing devices with which the reaction mixture, which passes through various consistency stages in the course of the reaction, can be comminuted as intensively as possible and thoroughly mixed. Devices with kneading and/or grinding action have proven to be especially useful. Examples are trough kneaders or mixers with oppositely directed kneading blades and agitator ball mills.

In kneaders, the kneading surfaces should always be covered by the sodium placed in the receiver (in the initial stage of the reaction) and by the initial product formed, which is colored dark to grey, (in the continuing reaction) in order to avoid corrosion of equipment by the aggressive reaction mixture.

The reactor contents; namely, the reaction mixture passes through various characteristic stages of consistency and coloration during the carrying out of the method in the plurality of reaction steps:

If sodium tetrasulfide, $Na_2S_4$, is used as initial material, then it is present at the start of the first method stage as a powdery material colored orange to yellow.

Sodium heated approximately 20° C. above the melting point is charged into the receiver in such a manner that a reactor temperature of 120°-250° C. can be maintained, with exterior cooling if necessary.

After a charging of approximately 2% of the required sodium, the powdery reactor contents is colored yellow.

After charging of approximately 6% of the required sodium, the color of the powdery reaction mixture present changes from yellow to a reddish color.

After charging of approximately 30-35% of the required sodium, the color of the powdery reaction mixture present changes to yellowish-grey.

After the addition of the remaining sodium has taken place, powdery reaction mixture turns bluish-black in color.

In the second method stage, heating takes place to 250°-480° C. with continued comminuting mixing. During this second stage the powdery nature of the reactor contents remains and the color turns from bluish-black to white.

In contrast to the prior art methods for preparing low polysulfides discussed above, the method of the invention purposely accepts the accumulation of non-molten solid substance in the reactor. The reaction of the sodium polysulfide with sodium is controlled in accordance with the plurality of reaction stages so that yields up to 97% of theory are obtainable at temperatures which are far below the melting point of the final product (about 1200° C.).

Of course, any desired polysulfide can also be obtained from the high-percentage sodium monosulfide obtained by means of melting it together with the appropriate amounts of sulfur. The invention is explained in more detail below with reference made to the illustrative embodiment.

EXAMPLE

A laboratory kneading machine with a trough of V4A formed from two semicylinders with polished inner walls was equipped with two polished blades of V4A in sigma form mounted in each instance on its own drive shaft.

The lower trough part was provided with a double jacket for receiving a heat-conducting medium. The screwed-on cover of V4A was provided with a connecting piece which was able to be closed with a screw cap and with an injection tube for introducing the protective gas argon terminating immediately underneath the cover. Both sodium and sulfur were charged in and the initial product removed through the connecting piece.

The blade speed could be varied between 40-60 rpms. A temperature sensor protective tube consisting of V4A was introduced into the trough or the reaction space through one of the four side walls parallel to the shafts on which the blades were mounted. The clear interior length of the trough was 100 mm, its clear width 117 mm and its clear depth 110 mm. The useful volume of this trough was 750 ml. Accordingly, this trough was able to receive approximately 500 g of initial product.

Prior to the start of the batchwise production, the trough was heated, whereby its lower part was loaded with heat-conducting oil with a temperature of 160° C. The trough was flushed with approximately 20 l argon per hour. Thereafter, 167.3 g sodium tetrasulfide, $Na_2S_4$, in the form of pellets were charged. After the pellets were ground, molten sodium was added through the connecting piece, which could be closed by a screw cap, in small portions to the $Na_2S_4$. At the start, the amount of sodium per portion was approximately 1 g. During the course of the reaction it was increased to 5 g per portion. The charging of the sodium was controlled in such a manner that the temperature in the reaction space did not rise higher than 220° C.

During the portion-by-portion addition of a total of 132.7 g sodium over a time period of approximately 3.5 hours the blade speed remained constant at 50 rpms. During the addition of Na, the granular to powdery reaction mixture assumed different color shades of yellow, red, grey to dark black at the end of the dosing of Na. After the initial product had cooled off, a specimen was taken for analysis.

An analysis yielded:

58.6% by weight total sodium (theoret. 59.0%)
41.4% by weight total sulfur (theoret. 41.0%).

Of the total sulfur, 36.9 % sulfur is present in the initial product in the form of the sulfide. The determination of sulfide was performed iodometrically. The total sulfur content was determined after oxidation of the sulfur with $H_2O_2$ in an alkaline medium to the sulfate gravimetrically as $BaSO_4$.

The total sodium content was determined with flame photometry. Sodium which had not participated in the reaction was detected gasometrically. An amount of 4.5% by weight was found hereby. The initial product, which contained more than 90% by weight sodium monosulfide, was placed in a laboratory reactor which was able to be heated up to approximately 400° C. for the postreaction of the constituents sodium and sulfur which had not yet reacted to the sulfide.

The cylindrical laboratory reactor consisting of the aluminum alloy AlMg3 with a bottom plate formed of a flanged-on cover, also made of AlMg3, with a connecting piece closable by a screw cap, fitted with an injection tube for introducing the protective gas argon terminating under the cover, with a temperature sensor protective tube and a stuffing box in the cover for passing through of the vertically standing blade agitator shaft which was jacketed with AlMg3 and on which the agitator blades of AlMg3 were fastened. The reactor exhibited a clear height of 150 mm and a clear width of likewise 150 mm.

In order to achieve an optimum agitator action in the laboratory reactor, the amount of 300 g initial product had to be doubled. Therefore, the same amount was prepared once again in the manner as described above the laboratory kneading machine.

After 600 g of the black, powdery product from the 2 batches had been charged, the reactor, provided with a heat insulated jacket, was placed on an infinitely variable electric heating plate and evenly heated to 370° C. during the course of 1.5 hours. The initial product was intensively agitated during the heating. The agitator speed was adjusted to 100 rpms. A strong agitating motor was required for this since the initial product tended to form clumps after reaching 300° C. The reactor was flushed during the heating and the postreaction with a current of inert gas of 30 l per hour.

After cooling, the final product, which was now white, was removed from the reactor and sieved according to size. The mesh size of the sieve was 0.355 mm. Approximately 70% of the sieved reaction product was recovered in this manner as homogeneous, white powder.

An analysis of this product yielded the following composition:

59.0% by weight Na (theoret. 58.97% by weight)
41.0% by weight S (theoret. 41.03% by weight).

The coarse-particle fraction (sieve retainings) exhibited the composition $Na_2S$; however, it was inhomogeneous as regarded the sulfur content of the individual particles, that is, the particles contained in part slight amounts of polysulfide (approximately 1-5% by weight).

The following quantitative balance results from that which has just been described:

| | |
|---|---|
| Material placed in the kneader (total): | 334.6 g $Na_2S_4$ |
| Sulfur added (total): | 265.4 g sodium |
| Production of initial product: | 600 g |
| Amount placed in laboratory reactor: | 600 g init. prod. |
| Amount removed from laboratory reactor: | 600 g final prod. |
| Sieve fraction < 0.355 mm: | 420 g $Na_2S$; |

Remainder of inhomogeneous particle fraction <0.355 mm:180 g

The inhomogeneous particle fraction <0.355 mm:from the method of preparing $Na_2S$ was collected and supplied to the kneader for the first conversion stage. After one hour of grinding at 50 rpms under an atmosphere of argon, a fine powder was obtained which can be placed in the kneader and used for a new batch.

Further variations and modifications of the foregoing will become apparent to those skilled in the art and are intended to be encompassed by the claims appended hereto.

We claim:

1. A method of preparing sodium monosulfide by means of reacting a sodium polysulfide with sodium under protective gas, comprising in a first stage placing sodium polysulfide in a finely distributed, solid state in a reactor means, preheated to temperature of 100°-150° C., gradually adding liquid sodium in the required amount to the sodium polysulfide in the reactor means under intensive mixing to form a solid reaction mixture, while maintaining the temperature of the reaction mixture at 120°-250° C. in said first stage to thereby form a bluish-black reaction product, in a second stage reacting the formed bluish-black reaction product under continuation of the mixing at 250°-480° C., until a $Na_2S$ content of at least 95% by weight has been attained with light coloring, said first and second stages not involving a melt.

2. The method according to claim 1 wherein mixing takes place under kneading and/or grinding.

3. The method according to claim 1 wherein the temperature of the reaction mixture is maintained in said first stage at 140°-200° C.

4. The method according to claim 1 wherein the temperature in the second stage is 350°-400° C.

* * * * *